United States Patent
Henning

(10) Patent No.: US 8,661,813 B2
(45) Date of Patent: Mar. 4, 2014

(54) METHOD FOR CONTROLLING AND/OR ADJUSTING A CHARGING PRESSURE OF AN EXHAUST GAS TURBOCHARGER AS WELL AS AN INTERNAL COMBUSTION ENGINE

(75) Inventor: Hermann Henning, Ellhofen (DE)

(73) Assignee: Audi AG, Ingolstadt (DE)

( * ) Notice: Subject to any disclaimer, the term of this patent is extended or adjusted under 35 U.S.C. 154(b) by 912 days.

(21) Appl. No.: 12/566,185

(22) Filed: Sep. 24, 2009

(65) Prior Publication Data

US 2010/0083657 A1   Apr. 8, 2010

(30) Foreign Application Priority Data

Sep. 24, 2008 (DE) .......................... 10 2008 048 679

(51) Int. Cl.
*F02D 23/00* (2006.01)

(52) U.S. Cl.
USPC ........................................................... 60/602

(58) Field of Classification Search
USPC ..................................... 60/602, 598
See application file for complete search history.

(56) References Cited

U.S. PATENT DOCUMENTS 5,174,119 A * 12/1992 Hanauer et al. ................. 60/602
5,440,879 A *  8/1995 Dellora ............................ 60/602
5,850,737 A * 12/1998 Aschner et al. ................. 60/602
6,418,719 B2 *  7/2002 Terry et al. ....................... 60/602
6,662,562 B2 * 12/2003 Engel et al. ..................... 60/602
2004/0093148 A1 *  5/2004 Buckland et al. ............. 701/102
2007/0151240 A1 *  7/2007 Mulloy ............................ 60/602

FOREIGN PATENT DOCUMENTS

DE    19531871 C1    11/1996
DE    10162970 A1     9/2003

* cited by examiner

*Primary Examiner* — Mary A Davis
(74) *Attorney, Agent, or Firm* — Novak Druce Connolly Bove + Quigg LLP

(57) ABSTRACT

The invention relates to a method for controlling and/or adjusting the charging pressure of an exhaust gas turbocharger of an internal combustion engine, the exhaust gas turbocharger having a turbine, a compressor which is driven by the latter and which makes available compressed fluid for the internal combustion engine, and a pressure setting device for setting the turbine inlet pressure. Here, it is provided that the turbine inlet pressure is set to a defined turbine inlet pressure such that for the internal combustion engine there is a maximum indicated medium pressure and/or a maximum effective medium pressure, the defined turbine inlet pressure being computed by means of an air model. The invention furthermore relates to an internal combustion engine with an exhaust gas turbocharger.

7 Claims, 3 Drawing Sheets

METHOD FOR CONTROLLING AND/OR ADJUSTING A CHARGING PRESSURE OF AN EXHAUST GAS TURBOCHARGER AS WELL AS AN INTERNAL COMBUSTION ENGINE

The invention relates to a method for controlling and/or adjusting a charging pressure of an exhaust gas turbocharger of an internal combustion engine, the exhaust gas turbocharger having a turbine, a compressor which is driven by the latter and which makes available a compressed fluid for the internal combustion engine, and a pressure setting device for setting the turbine inlet pressure. The invention furthermore relates to an internal combustion engine with an exhaust gas turbocharger.

BACKGROUND OF THE INVENTION

In motor vehicles with internal combustion engines which operate with charging, for example, by means of an exhaust gas turbocharger, during acceleration, mainly in full load accelerations from low rotational speed, very high deviations from a setpoint charging pressure occur because an existing actual charging pressure concurs with the previous, lower rotational speed, but the setpoint charging pressure for acceleration is (under certain circumstances significantly) higher. Adjustment and/or control of the charging pressure attempts to equalize the actual charging pressure to the setpoint charging pressure as quickly as possible by the pressure setting device for setting the turbine inlet pressure being set accordingly. For example, guide vanes of variable turbine geometry of the exhaust gas turbocharger can be closed; this leads to acceleration of the turbine and of the compressor driven by it, whereupon the actual charging pressure rises. Setting the pressure setting device results in a major increase of turbine inlet pressure, whereby the medium pressure of charge alteration of the internal combustion engine also rises. But at the same time, among other things due to the mass inertia of the turbine and the compressor, only a comparatively moderately higher intake manifold pressure is available for increasing the amount of air in the cylinder. The intake manifold pressure therefore rises more slowly than the turbine inlet pressure. Since the turbine inlet pressure essentially corresponds to the pressure downstream from the internal combustion engine, the internal combustion engine must counteract this when exhaust gases are expelled. Since during acceleration the turbine inlet pressure rises quickly, but the intake manifold pressure, however, comparatively slowly, the efficiency of the internal combustion engine drops. Thus, on the crankshaft of the internal combustion engine, against the wishes of the driver of the motor vehicle for maximum acceleration, the maximum torque of the internal combustion engine is not available.

DE 195 31 871 C1 discloses a method for setting the charging pressure in an internal combustion engine charged by means of an exhaust gas turbocharger with an adjustable turbine guide apparatus. The charging pressure is to be set to a given charging pressure setpoint which is dependent on the operating point. For this purpose, a pressure difference is determined which is computed from the turbine inlet pressure and the intake manifold pressure. These pressures are measured by way of sensors and the measured values are supplied to a control unit. Furthermore, the measured values of the rotational speed of the internal combustion engine and the current injection amount are supplied to the control unit. This has the disadvantage that there must be a plurality of values as measured values, as a result of which the number of sensors is comparatively large. For example, a residual amount of gas also remains in a cylinder, i.e., the amount of gas remaining in the cylinder after an expulsion process is ignored.

On this basis, the object of the invention is to improve a method for controlling and/or adjusting the turbine inlet pressure of an exhaust gas turbocharger of an internal combustion engine of the initially mentioned type such that it manages with a minimum number of sensors and nevertheless accomplishes high efficiency of the internal combustion engine.

SUMMARY OF THE INVENTION

This object is achieved according to the invention in that the turbine inlet pressure is set to a defined turbine inlet pressure such that for the internal combustion engine a maximum indicated medium pressure and/or maximum effective medium pressure is present, the defined turbine inlet pressure being computed by means of an air model. The medium pressure is a computed quantity for assessing the efficiency and the alteration of the charge of internal combustion engines. The indicated medium pressure corresponds to the average value of the pressure which prevails within the cylinder of the internal combustion engine during one working stroke. The effective medium pressure results from the performed work of the internal combustion engine and the cylinder displacement. The higher the indicated medium pressure or the effective medium pressure, the higher the efficiency of the internal combustion engine. The turbine inlet pressure is to be set by means of the pressure setting device such that even during acceleration of the internal combustion engine an indicated medium pressure as high as possible and/or an effective medium pressure as high as possible prevails. The defined turbine inlet pressure therefore corresponds to an optimum turbine inlet pressure at which the efficiency of the internal combustion engine is higher than if the turbine inlet pressure is increased abruptly during the acceleration of the internal combustion engine. The maximum indicated medium pressure and/or the maximum effective medium pressure can also be described by local peaks, i.e., peaks known at an instantaneous time. The defined turbine inlet pressure is computed by means of the air model. The air model can compute mass flows, pressures and/or temperatures on the inlet and/or outlet side of the internal combustion engine and/or of the turbocharger, particularly at any desired instant. It is therefore unnecessary to provide pressure sensors for measuring the turbine inlet pressure or the intake manifold pressure for the air model. But if these sensors are present, they can be used to improve or specify the computed values. The input quantity of the air model can be at least one of the quantities rpm of the internal combustion engine, injection amount, and torque desired by the driver. With model-based control and/or adjustment, the increase of the turbine inlet pressure is to be limited or controlled and/or adjusted such that a torque of the internal combustion engine as large as possible will always be achieved.

One development of the invention calls for the turbine inlet pressure to be set with a continuous or incremental characteristic to the defined turbine inlet pressure. After determining the defined turbine inlet pressure, the prevailing turbine inlet pressure is therefore preferably equalized to it with a gentle characteristic that is free of sudden changes. Therefore, sudden changes in the turbine inlet pressure are not to occur. This would mean unnecessary mechanical loads on the turbocharger. Alternatively, there can also be an incremental characteristic so that the turbine inlet pressure reaches the defined turbine inlet pressure in several steps which are comparatively small relative to the total difference between the turbine inlet pressure and the defined turbine inlet pressure.

One development of the invention calls for the residual gas amount in at least one cylinder of the internal combustion engine and/or the supplied fresh air mass in the cylinder to be determined by means of the air model. The air model is thus expanded by a residual gas model. The air model, in addition to the already described quantities, can also determine the actual residual gas amount in the cylinder. In this way, the degree of purging of the cylinder during fresh gas entry can be determined or optimized. Alternatively or additionally, the fresh air mass in the cylinder or the total mass of air in the cylinder at air inlet closure (mLuZ) can be determined and/or computed based on the residual gas amount. Without this residual gas model the effect of high turbine inlet pressures on the residual gas and thus also on the filling of the cylinder cannot be taken into account and the error in determining the fresh air mass or the total mass (mLuZ) present in the cylinder would be comparatively large. This is due to the fact that higher turbine inlet pressures lead to a higher proportion of residual gas so that less fresh air can flow into the cylinder. Therefore, the total mass (mLuZ) in the cylinder is to be determined on the basis of the residual gas amount.

One development of the invention calls for the residual gas amount and/or the fresh air mass to be determined at the air inlet closure of the cylinder. The air inlet closure is the instant at which the air inlet valve of the cylinder closes, as a result of which no further fresh air can travel into the cylinder. Subsequent to air inlet closure, compression of the contents of the cylinder and ignition of the fuel which has been delivered into it takes place. In order to compute the defined turbine inlet pressure at which the maximum indicated medium pressure and/or the maximum effective medium pressure prevails, the fresh air mass or total mass (mLuZ) contained in the cylinder must be known in order to optimize the purging process by matching the turbine inlet pressure. For this purpose, the entire residual gas amount remaining in the cylinder can also be determined. In this case, the residual gas amount is the amount of gas which has remained in the cylinder from the previous strokes.

One development of the invention calls for the air remaining in the residual gas to be considered in the determination of the total mass of air in the cylinder (mLuZ) at air inlet closure. For lean operation of the internal combustion engine, more air is contained in the cylinder than is necessary for complete combustion of the fuel. This means that following combustion, the residual gas continues to contain air which has not participated directly in the combustion process. In order to be able to determine the total mass (mLuZ) as accurately as possible and thus also to optimize the defined turbine inlet pressure (i.e., to achieve a higher maximum indicated and/or a higher maximum effective medium pressure), in the determination of the total mass (mLuZ) the proportion of air remaining in the residual gas is taken into account. This can be accomplished, for example, as a model, since essentially the fresh air mass delivered into the cylinder and the injected amount of fuel are known (either by measuring or likewise by model considerations).

One development of the invention calls for a high pressure medium pressure to be determined based on the total mass (mLuZ) and the injected amount of fuel. The high pressure medium pressure is the medium pressure which is present in the high pressure strokes—i.e., the compressing and expanding strokes. Based on this total mass (mLuZ) known from the air model or the air model and the residual gas model and on the injected amount of fuel which can be, for example, measured and/or determined by modeling, the high pressure medium pressure is determined. It represents a quantity which is necessary for determining the indicated medium pressure and the effective medium pressure.

One development of the invention calls for the high pressure medium pressure to be determined from a family of characteristics. The family of characteristics is, for example, stored in the control/adjustment unit of the internal combustion engine. Beforehand, two families of characteristics of the internal combustion engine with axes rpm and total mass (mLuZ) are determined on a test bench, with which an empirical correlation between the amount of fuel which is the maximum possible at a given total mass (mLuZ) and the resulting high pressure medium pressure can be established. The maximum injectable amount of fuel for a given total mass (mLuZ) at a specific rotational speed of the internal combustion engine is dictated in a gasoline engine by the knock limit and in a diesel engine by the maximum allowable soot formation.

One development of the invention calls for the charge alteration medium pressure to be computed with the charge alteration model. The charge alteration medium pressure is the medium pressure during the charge alteration strokes—i.e., during the intake and expulsion strokes.

One development of the invention calls for the charge alteration model to use at least the turbine inlet pressure, an intake manifold pressure and the rotational speed of the internal combustion engine as input quantities. For example, to determine the charge alteration medium pressure a simple model in the form $p_{LW} = A \cdot (p_3 - p_{SR}) + B$ can be used. Here the coefficients A and B are stored in the form of a characteristic over the rotational speed of the internal combustion engine. As already described above, at least the turbine inlet pressure and the intake manifold pressure are determined by modeling. But if there are sensors which record one of these quantities, of course, the measured value can be used to improve the results for the charge alteration medium pressure.

One development of the invention calls for an instantaneous indicated medium pressure and/or an instantaneous effective medium pressure to be determined from at least the charge alteration medium pressure and the high pressure medium pressure. If the quantities charge alteration medium pressure and high pressure medium pressure are available, the quantities indicated medium pressure and effective medium pressure can be determined. In this way, the instantaneous efficiency of the internal combustion engine can be assessed by way of the instantaneous effective medium pressure and/or the instantaneous indicated medium pressure.

One development of the invention calls for an imaginary indicated medium pressure and/or an imaginary effective medium pressure at higher and/or lower turbine inlet pressure to be computed in addition to the instantaneous indicated medium pressure and/or the instantaneous effective medium pressure. Parallel to the instantaneous medium pressure an imaginary medium pressure is continuously computed which would result if the turbine inlet pressure were higher or lower than the instantaneous turbine inlet pressure. Here, the higher or lower turbine inlet pressure can be selected respectively with an absolute interval to the instantaneous turbine inlet pressure or with a relative interval with respect to the instantaneous turbine inlet pressure. The relative interval can be specified as a constant percentage or in the form of a characteristic by way of the turbine inlet pressure. In the latter case, the relative interval is designed to be variable. To compute the imaginary indicated and/or effective medium pressure, the intermediate quantities, i.e., conventionally the high pressure medium pressure which is determined, in particular, from the empirically determined family of characteristics with the axes rpm and total mass (mLuZ), and/or the charge alteration medium pressure is determined, based on the assumption that the turbine inlet pressure would be higher and/or lower. Thus, in addition to the instantaneous indicated medium pressure and/or the instantaneous effective medium pressure, an imaginary instantaneous indicated medium pressure and/or an imaginary instantaneous effective medium pressure is known which can be compared to the instantaneous medium pressure. In this way, it is established whether the (instantaneous) indicated medium pressure and/or the (instantaneous) effective medium pressure is already maximum or whether higher values for these quantities can be achieved at a higher and/or lower turbine inlet pressure.

One development of the invention calls for the defined turbine inlet pressure to be set equal to the higher or lower turbine inlet pressure when the corresponding imaginary indicated or effective medium pressure is higher than the instantaneous indicated or effective medium pressure. If parallel evaluation of the instantaneous medium pressure and of the imaginary medium pressure (each indicated and/or effective) shows that the imaginary medium pressure is greater, the defined turbine inlet pressure is set equal to the higher or lower turbine inlet pressure. In this way, the result is that the effective and/or indicated medium pressure is increased.

If the described procedure is executed repeatedly, the indicated or effective medium pressure approaches the maximum possible indicated or effective medium pressure. This can be combined with continuous or incremental matching of the turbine inlet pressure to the defined turbine inlet pressure so that no sudden changes in the indicated or effective medium pressure occur. Overall this means that by means of the pressure setting device the turbine inlet pressure is set such that the turbine inlet pressure approaches the optimum turbine inlet pressure so that the indicated and/or effective medium pressures are maximum. This means that at any instant the internal combustion engine makes available the maximum possible torque. To accelerate the calculation, or to save computing time, depending on the result of the preceding calculation, it can be advantageous to carry out the next calculation only with the higher and/or lower turbine inlet pressure.

One development of the invention calls for the friction losses of the exhaust gas turbocharger, in particular of a moving component, to be taken into account as a function of the oil temperature in the determination of the instantaneous or imaginary indicated and/or effective medium pressure. The moving component is formed by the rotating parts of the exhaust gas turbocharger, i.e., the turbine wheel of the turbine, the compressor wheel of the compressor and the shaft which connects them. The dynamic behavior of the moving component is very highly dependent on the oil temperature. Therefore, it is advantageous if the air model is expanded by an extra module which takes into account the friction losses of the exhaust gas turbocharger, in particular of the moving component. Here, the friction losses are included in the computation as a function of the oil temperature. The friction losses of the exhaust gas turbocharger increase the time required until a certain state is achieved (for example, the rotational speed of the exhaust gas turbocharger) so that at higher friction losses the intake manifold pressure rises much more slowly than at low friction losses. This additional delay can be incorporated into the computation of the defined turbine inlet pressure as a function of the oil temperature. For example, at high friction losses the defined turbine inlet pressure is increased more slowly by control and/or adjustment (in the case of acceleration) than at lower friction losses.

One development of the invention calls for a friction medium pressure of the internal combustion engine to be taken into account in the determination of the instantaneous and/or imaginary effective medium pressure. In order to achieve maximum torque of the internal combustion engine it is advantageous to also take into account the change of friction of the internal combustion engine with the high pressure medium pressure. Since the effective torque (and, accordingly, also the effective medium pressure) is determined not only by the indicated medium pressure, but is also a function of the friction medium pressure, it is advantageous to incorporate it into the optimization.

One development of the invention calls for the friction medium pressure to be determined by means of a family of characteristics in which at least the rotational speed and the high pressure medium pressure of the internal combustion engine are plotted. Therefore, there is a family of characteristics in which the friction medium pressure is stored as a function of the rotational speed of the internal combustion engine and of the high pressure medium pressure. This can be provided, for example, in the control/adjustment unit. Using the family of characteristics, the defined turbine inlet pressure can be determined such that the maximum effective torque or the maximum effective medium pressure is present. Here, the effective medium pressure corresponds to the indicated medium pressure minus the friction medium pressure. The friction medium pressure therefore corresponds to the pressure loss which is caused by friction within the internal combustion engine.

One development of the invention calls for there to be a family of characteristics for determination of the friction medium pressure for different coolant temperatures. The coolant temperature has an especially strong effect on the friction medium pressure. Therefore, it is advantageous if this is taken into account in the determination of the friction medium pressure. There is thus a family of characteristics for determining the friction medium pressure for different coolant temperatures.

One development of the invention calls for the pressure setting device to be a waste gate and/or a variable turbine geometry. The waste gate is a setting device by means of which the fluid pressure upstream from the exhaust gas turbocharger can be reduced by the fluid or exhaust gas being routed around the exhaust gas turbocharger or being released into the exterior. Advantageously, a variable turbine geometry can also be used. This conventionally allows setting of guide vanes which are located in the exhaust gas turbocharger and which route the exhaust gas to a turbine wheel.

The invention furthermore relates to an internal combustion engine with an exhaust gas turbocharger, in particular for implementation of the method according to the aforementioned, and with a control/adjustment unit for controlling and/or adjusting the exhaust gas turbocharger, the exhaust gas turbocharger having a turbine, a compressor which makes available compressed fluid for the internal combustion engine and which is driven by the turbine, and a pressure setting device which can be set by the control/adjustment unit for setting the turbine inlet pressures. Here, it is provided that the turbine inlet pressure can be set by means of the pressure setting device to a defined turbine inlet pressure which is computed by the control/adjustment unit by means of the air model such that for the internal combustion engine there is a maximum indicated medium pressure and/or maximum effective medium pressure. The internal combustion engine can, of course, be further developed according to the aforementioned. The control/adjustment unit, in addition to the control and/or adjustment of the exhaust gas turbocharger, can also assume other tasks, such as, for example, control and/or adjustment of the internal combustion engine.

DETAILED DESCRIPTION OF THE PREFERRED EMBODIMENTS OF THE INVENTION

Figure 1:
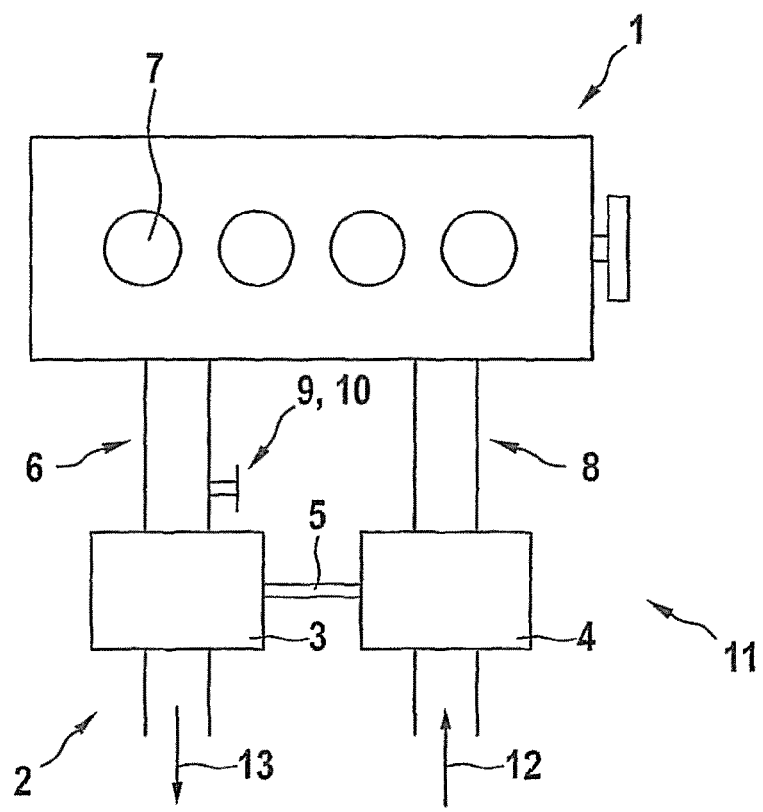
FIG. 1 shows a schematic of the internal combustion engine with an exhaust gas turbocharger.

FIG. 1 shows a schematic of an internal combustion engine 1 having an exhaust gas turbocharger 2. The exhaust gas turbocharger 2 has a turbine 3 and a compressor 4 which are dynamically connected by way of a shaft 5. The turbine 3 drives the compressor 4 by way of the shaft 5. The turbine 3 is connected to the exhaust valves (not shown) by the cylinders 7 of the internal combustion engine 1 by way of at least one outlet channel 6. The compressor 4 is conversely connected by way of at least one inlet channel 8 to inlet valves of the cylinders 7 which are likewise not shown. On the exhaust channel 6, i.e., between the turbine 3 and exhaust valves of the cylinders 7, there is a pressure setting device 9 which is designed as a waste gate 10. Instead of the waste gate 10 the turbine 3 can, however, also be equipped with a variable turbine geometry. On the inlet side 11 of the internal combustion engine 1, air can travel along an arrow 12 into the compressor 4 and can be compressed there. The compressed air is supplied to the cylinders 7 of the internal combustion engine through the inlet channel 8. Following combustion which takes place there, exhaust gases are supplied to and drive the turbine 3 through the outlet channel 6. By way of the shaft 5 the power which is made available in this way is transmitted to the compressor 4 so that it can for its part compress the inflowing air. Downstream from the turbines 3, the exhaust gas is released into the exterior according to arrow 13 or is delivered to exhaust gas aftertreatment measures.

Figure 2:
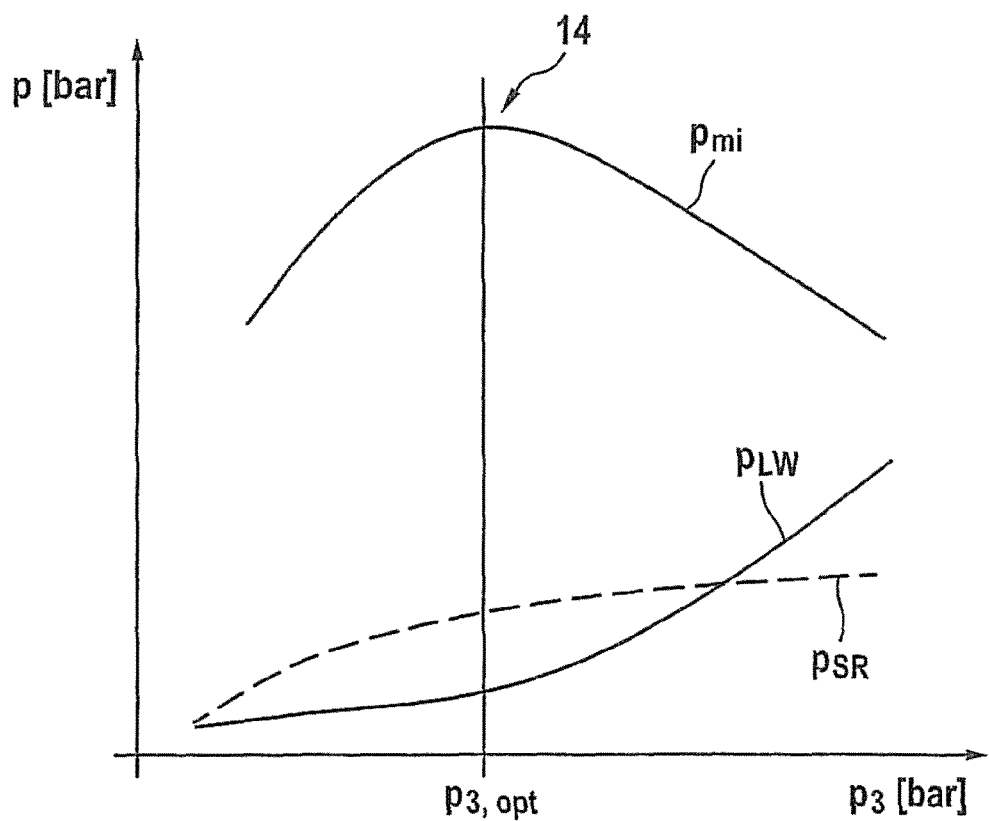
FIG. 2 shows a diagram in which an indicated medium pressure, a charging alteration changing medium pressure and an intake manifold pressure are plotted over a turbine inlet pressure.

FIG. 2 shows a diagram in which the indicated medium pressure $p_{mi}$, the charge alteration medium pressure $p_{LW}$ and the intake manifold pressure $p_{SR}$ are plotted over the turbine inlet pressure $p_3$. The intake manifold pressure is present in the inlet channel 8, the turbine inlet pressure in the outlet channel 6 of the internal combustion engine 1. All pressures are indicated in the unit bar. The diagram plots the pressure characteristics during one instant of acceleration of the internal combustion engine 1. This means that the pressure characteristics are a function of the acceleration and other ambient quantities. It can be recognized that for the indicated medium pressure there is a maximum 14 for a defined turbine inlet pressure $p_3$. This turbine inlet pressure is designated as $p_{3,opt}$. Since the indicated medium pressure is an indicator of the efficiency of the internal combustion engine 1, it is advantageous if the turbine inlet pressure $p_3$ is always chosen such that the internal combustion engine 1 is operated with the maximum indicated medium pressure $p_{mi}$ (see maximum 14). Analogously to the indicated medium pressure, an effective medium pressure $p_{eff}$ can also be used which results from the relation $p_{eff}=p_{mi}-p_r$, $p_r$ denoting the friction medium pressure of the internal combustion engine 1.

Figure 3:
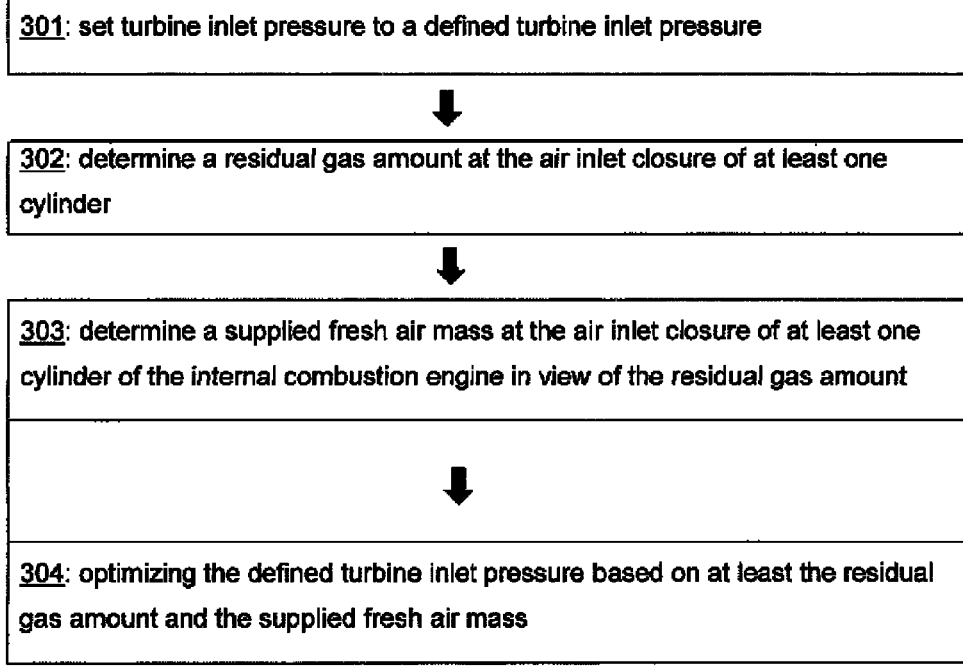
FIG. 3 is a block diagram indicating steps of a method according to the present invent.

One embodiment of the present invention is illustrated in FIG. 3. At step 301 a turbine inlet pressure is set to a defined turbine inlet pressure. At step 302 a residual gas amount at the air inlet closure of at least one cylinder is determined. At step 303 a supplied fresh air mass at the air inlet closure of at least one cylinder of the internal combustion engine is determined in view of the residual gas amount. At step 304, the defined turbine inlet pressure is optimized based on at least the residual gas amount and the supplied fresh air mass.

The invention claimed is:

1. A method for controlling the turbine inlet pressure of an exhaust gas turbocharger of an internal combustion engine, the exhaust gas turbocharger having a turbine, a compressor which is driven by the turbine and which makes available a compressed fluid for the internal combustion engine, and a pressure setting device for setting the turbine inlet pressure, the method comprising:

determining a residual gas amount at the air inlet closure of at least one cylinder of the internal combustion engine;

subsequently determining a supplied fresh air mass at the air inlet closure of at least one cylinder of the internal combustion engine based on the residual gas amount;

optimizing an optimized defined turbine inlet pressure based on at least the residual gas amount and the supplied fresh air mass; and setting the turbine inlet pressure to the optimized defined turbine inlet pressure;

wherein at the optimized defined turbine inlet pressure the internal combustion engine operates at one selected from the group consisting of a maximized indicated medium pressure, a maximized effective medium pressure, and combinations thereof.

2. The method according to claim 1 wherein the turbine inlet pressure is set continuously to the optimized defined turbine inlet pressure.

3. The method according to claim 1 wherein a friction medium pressure of the internal combustion engine is taken into account in the determination of at least one of maximized indicated medium pressure and the maximized effective medium pressure.

4. The method according to claim 3 wherein the friction medium pressure is determined by plotting at least a rotational speed of the internal combustion engine, and at least one of the maximized indicated medium pressure and maximized effective medium pressure.

5. The method according to claim 1 wherein the pressure setting device is selected from the group consisting of a waste gate a variable turbine geometry, and combinations thereof.

6. The internal combustion engine with the exhaust gas turbocharger comprising the pressure setting device for implementing the method according to claims 1.

7. The method according to claim 1 wherein the turbine inlet pressure is set incrementally to the optimized defined turbine inlet pressure.

\* \* \* \* \*